US007815764B2

(12) United States Patent
Perini

(10) Patent No.: US 7,815,764 B2
(45) Date of Patent: Oct. 19, 2010

(54) APPARATUS AND METHOD FOR CARRYING OUT A CONTINUED UNION OF PAPER WEBS

(76) Inventor: Fabio Perini, Via S. Francesco 1, I-55049 Viareggio (Lucca) (IT)

( * ) Notice: Subject to any disclaimer, the term of this patent is extended or adjusted under 35 U.S.C. 154(b) by 0 days.

(21) Appl. No.: 12/533,171

(22) Filed: Jul. 31, 2009

(65) Prior Publication Data

US 2009/0288757 A1 Nov. 26, 2009

Related U.S. Application Data

(63) Continuation of application No. 10/527,903, filed as application No. PCT/IT03/00849 on Dec. 22, 2003, now abandoned.

(30) Foreign Application Priority Data

Jan. 17, 2003 (IT) ................................ FI03A0015

(51) Int. Cl.
*B32B 37/00* (2006.01)

(52) U.S. Cl. ....................... 156/209; 156/219; 156/553; 156/555; 156/582

(58) Field of Classification Search ................ 156/555, 156/580, 582, 583.1, 583.3, 209, 219, 553
See application file for complete search history.

(56) References Cited

U.S. PATENT DOCUMENTS 6,030,690 A * 2/2000 McNeil et al. .............. 428/156

FOREIGN PATENT DOCUMENTS

DE 10043989 * 3/2001
JP 10249916 * 9/1998

* cited by examiner

*Primary Examiner*—James Sells
(74) *Attorney, Agent, or Firm*—McGlew and Tuttle, P.C.

(57) ABSTRACT

Apparatus for continually joining paper webs, comprising a device able to compress the webs (5,6) onto an impression cylinder or roller (4) while the webs advance toward an outlet section of the apparatus. The compressive device includes a roller or cylinder (2) which exhibits a hard outer surface (20) supported by an underlying elastic surface (23).

20 Claims, 12 Drawing Sheets

APPARATUS AND METHOD FOR CARRYING OUT A CONTINUED UNION OF PAPER WEBS

CROSS REFERENCE TO RELATED APPLICATION

This is a continuation under 37 CFR 1.53(b) of prior application Ser. No. 10/527,903 filed Mar. 14, 2005, now abandoned which is a United States National Phase application of International Application PCT/IT2003/000849 filed Dec. 22, 2003 and claims the benefit of priority under 35 U.S.C. §119 of Italian Patent Application FI 2003A000015 filed Jan. 17, 2003, the entire contents of each of the applications are incorporated herein by reference.

FIELD OF THE INVENTION

The present invention refers to an apparatus and a method for continually joining paper webs.

BACKGROUND OF THE INVENTION

Apparatus for carrying out a continued union of paper web is known from DE-A-100 43 989 and from U.S. 2001/019757. These documents describe an apparatus for carrying out the union of two paper webs by a mutual compression of the concerned webs, in which the webs are compressed between a pressure roller and an impression roller provided with surface reliefs and/or depressions.

An apparatus usually employed for a continuous union of paper webs comprises, with reference to the outline of FIG. 1, two pairs of rollers and cylinders (A, B; C, D) for embossing paper webs (E, F), a roller (G) for distributing a given amount of glue onto the paper which transits in correspondence of one of the embossing rollers, and an impression roller with rubber-coated surface (H) positioned diametrically opposite to the gluing roller (G): the paper webs (E, F) result embossed as they transit between the surfaces of the corresponding embossing rollers and cylinders, that is, as they pass through the regions indicated by "X" and "Y" in FIG. 1, and become definitively glued by their passing onto the embossing roller (B) and because of the pressure exerted thereon by the rubber-coated roller (H). In FIG. 1, the arrows (VE, VF, VA) indicate the directions of advancement of web (E), web (F) and of the exiting coupled webs (AC).

One drawback relating to this operating technique lies in the fact that, because of the very compliance of the material that sheathes the output pressure roller (H), and of the pressure that this roller exerts on the first embossing cylinder (B), the material of the pressure roller penetrates the surface cavities of the cylinder. As a consequence, a mutual squashing of the two paper webs occurs throughout the space within which the coating material of the pressure roller fits into the cavities of the embossing cylinder (as shown in FIG. 2A) and, accordingly, a kind of re-embossing is produced with a noticeable roughness on one of the two sides of the output material (see FIG. 2B, wherein "L" indicates the deformations in the coupled webs with respect to the ideal profile). Another drawback related to the use of this type of apparatus lies in the fact that the glue distribution's system brings about significant expenses due to the cost of the mechanical members and of the adhesive, and to the difficulty in keeping the system clean.

Another device commonly used for continually joining paper webs comprises a group—downstream of the embossing rollers and cylinders according to the outline of FIG. 3A—consisting of a smooth roller having a hard surface (Z) and a set of small rollers with surface reliefs (W) so disposed that the outputting coupled webs will pass, by resting on the smooth roller (Z), under the small rollers (W). In this way, the reliefs of the small rollers will cause the mutual squashing of the two paper webs and, thereby, their union, without using any adhesive whatsoever.

One drawback related to such a device lies in that, in correspondence of the regions interested by the action of the small rollers, the embossing previously produced is lost and, on the coupled webs exiting from the device, two or more areas developed there along result markedly visible (as illustrated in FIG. 4 where "AC" indicates the coupled webs, "AM" indicate the above said areas, and an array of dots indicates the embossing operated upstream of the group and including the small rollers). In conclusion, also this known operating technique implies a partial but anyway evident lost of the effects derived by the embossing of the two webs which make up the coupled webs. A further drawbacks related to the use of this type of device is that the small rollers tend to vibrate when a given operating speed of the system has been exceeded and, thus, they tend to wear out prematurely, so that an upper limit is to be provided on the operable speed which results incompatible with the current production requirements. The said marks (AM) do not result, more often than not, perfectly centered with respect to the rolls formed when cutting the log of the coupled webs, which contributes to make the same marks (AM) still more unappealing.

SUMMARY OF THE INVENTION

The main object of the present invention is to overcome the above said drawbacks.

The present invention makes it possible to carry out a continued union of two paper webs, with or without a previous embossing and with or without the use of glue, without producing undesired surface deformations of the coupled webs which, therefore, result of a better quality. Besides, an apparatus according to the invention is easy to make, cost-effective and reliable even after a prolonged service life.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Reduced to its basic structure, and reference being made to FIGS. 5A-7 of the attached drawings, an apparatus according to the invention can be used in association with means for the embossing of the coupled webs (1) and is made up of a roller (2) having an outer surface (20) applied upon an elastic support surface: the roller (2) being engaged, free of rotating about its longitudinal axis, with a supporting fixed structure (not shown in the figures of the attached drawings for the sake of simplicity).

Figure 1:
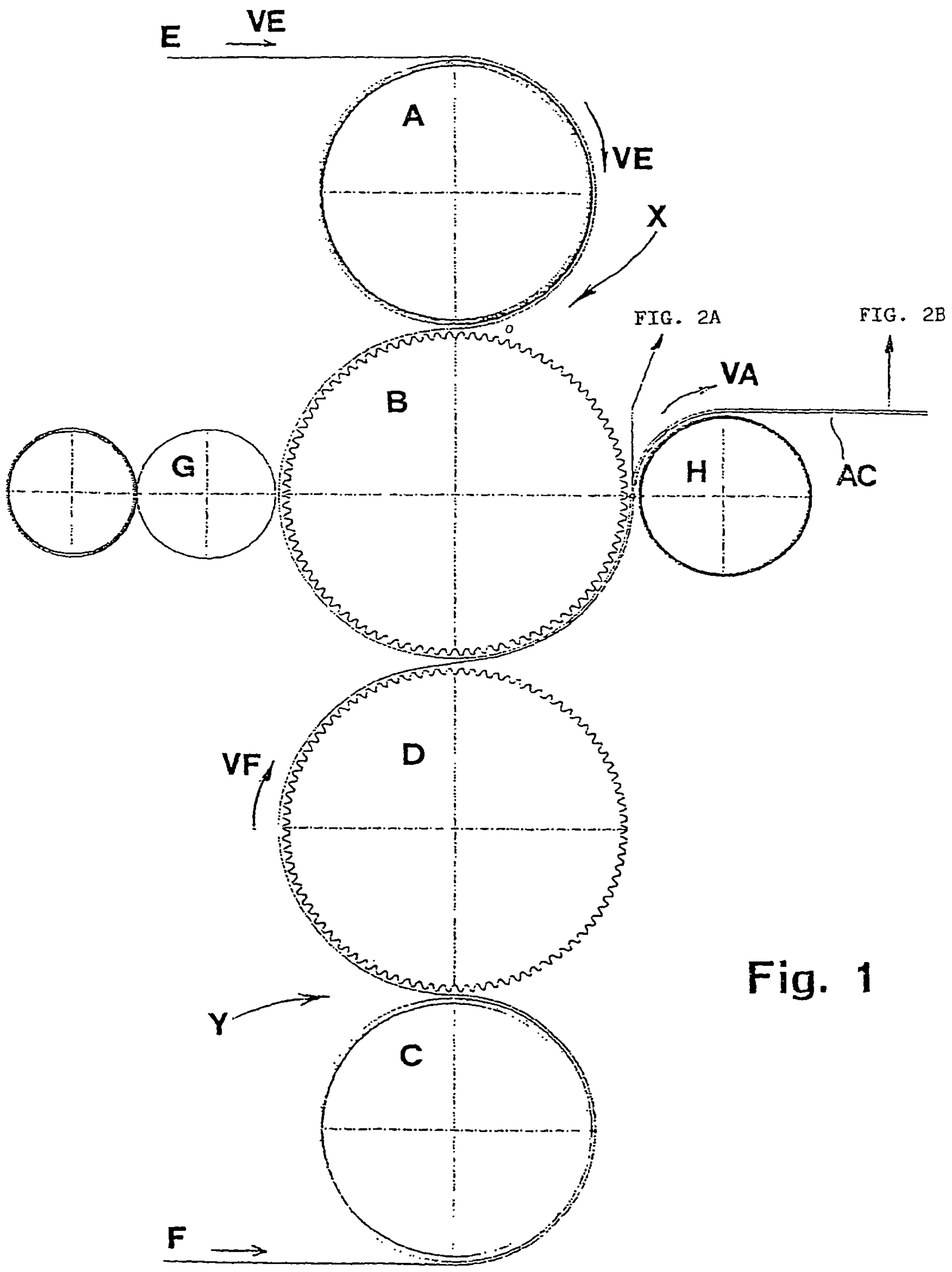
FIG. 1 is a simplified functional diagram of a known device.
Figure 2B:
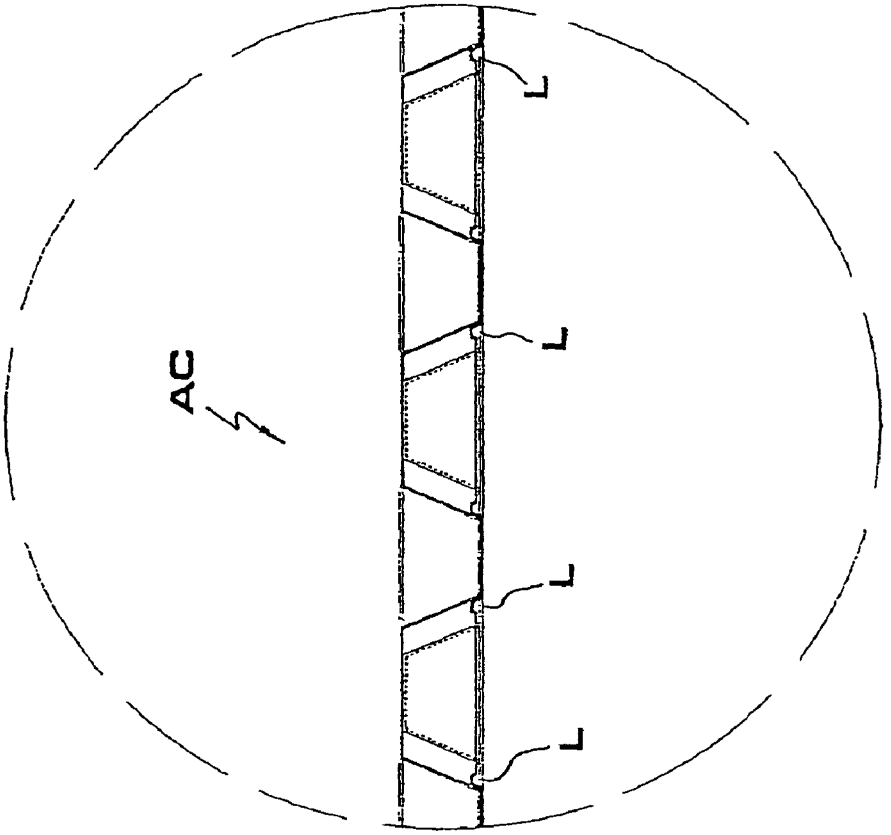
FIGS. 2A and 2B are two enlarged details of FIG. 1 relating to means for the stabilization of the coupled webs.
Figure 2A:
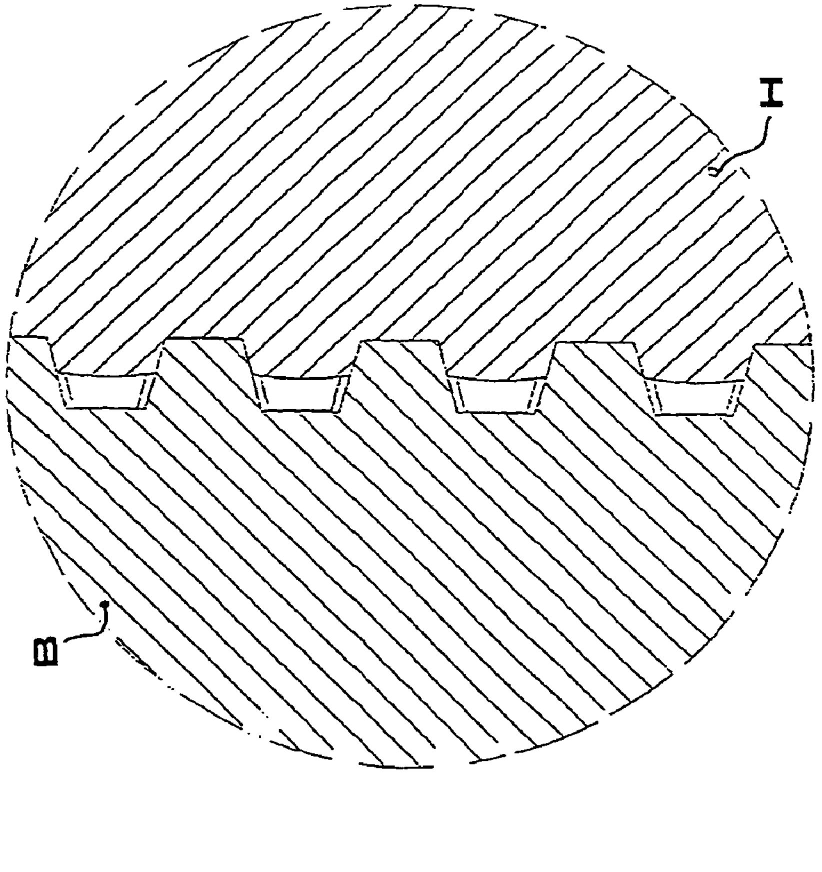
Figure 3A:
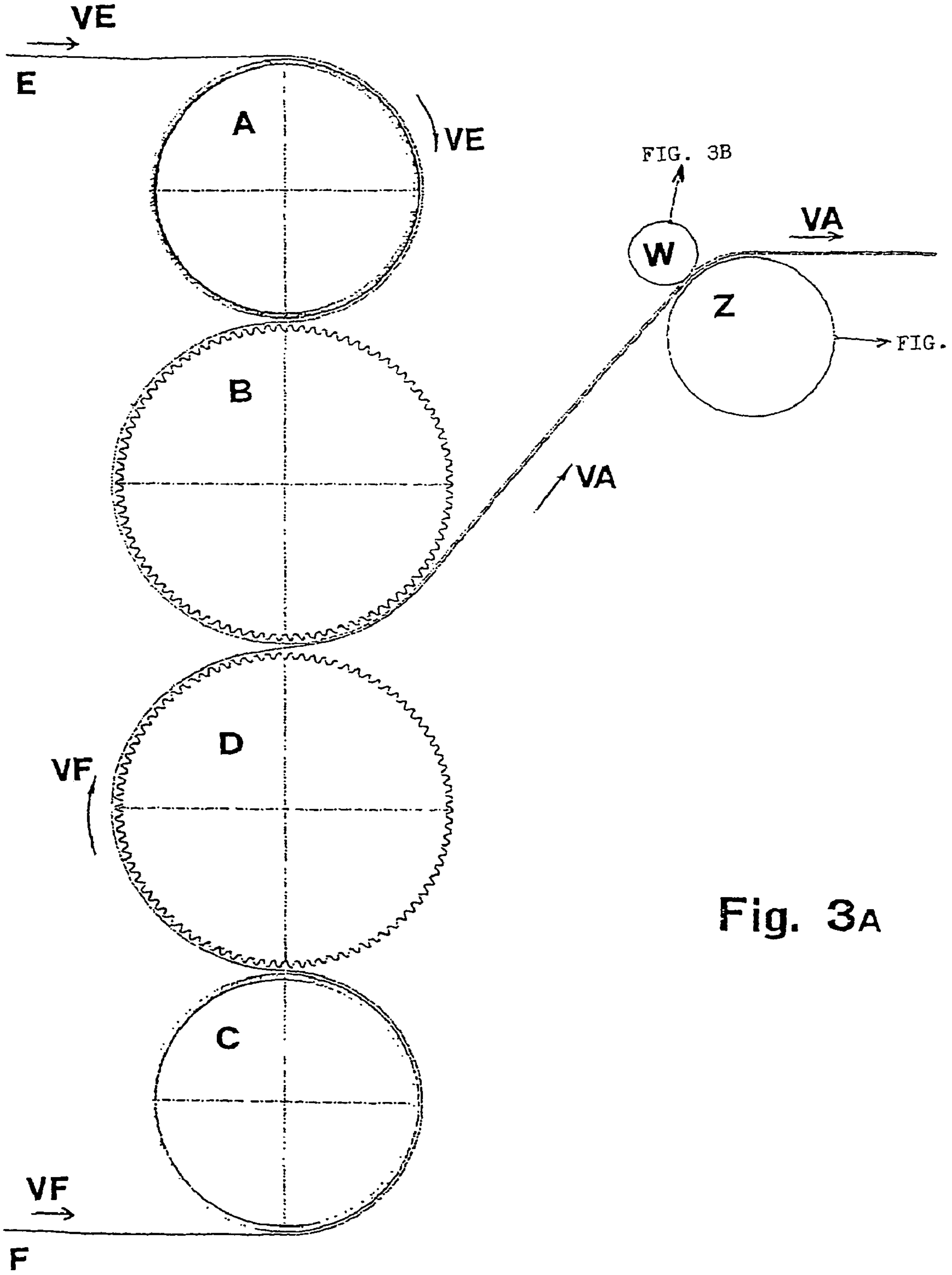
FIG. 3A is a diagram similar to that of FIG. 1 but relating of another known device.
Figure 3C:
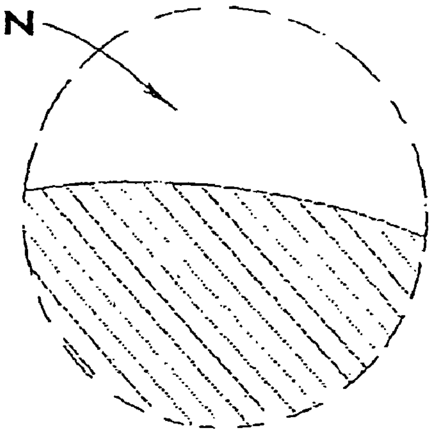
FIGS. 3B and 3C are two enlarged details of FIG. 3A.
Figure 3B:
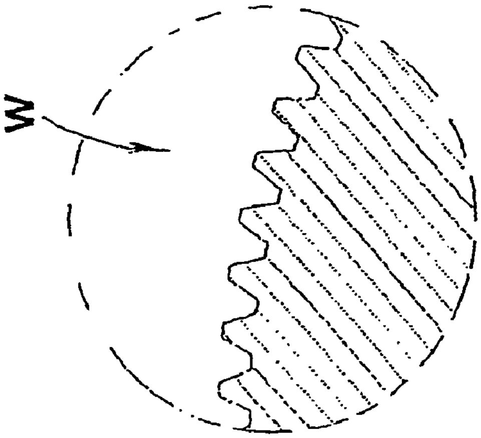
Figure 4:
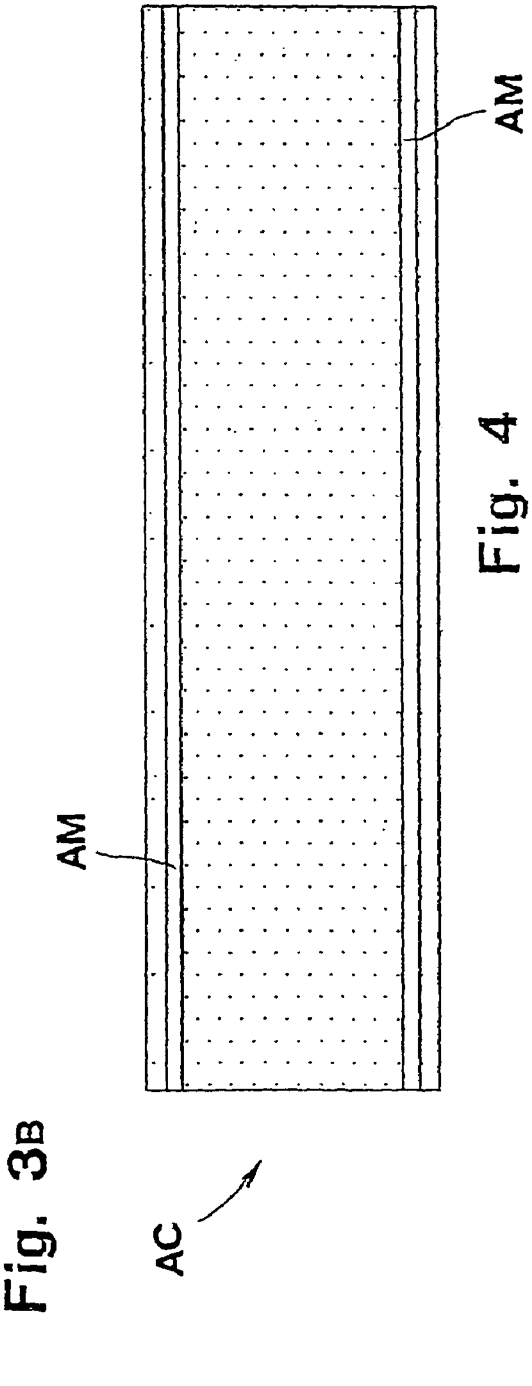
FIG. 4 is a schematic plan view of the coupled webs on output from the device of FIG. 3A.
Figure 5A:
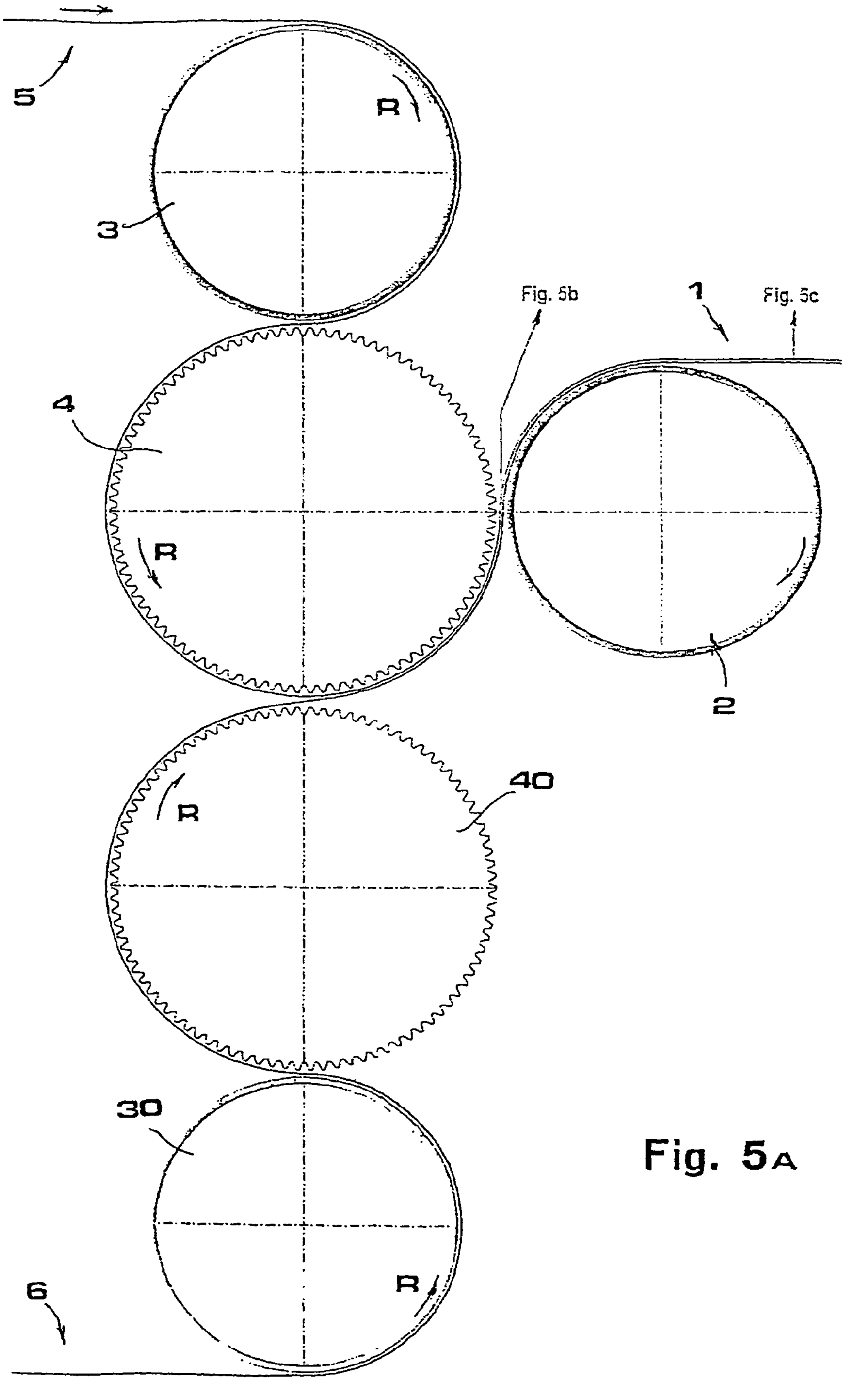
FIG. 5A is a diagram similar to that of FIGS. 1 and 3A but relating to an apparatus according to the present invention.
Figure 5C:
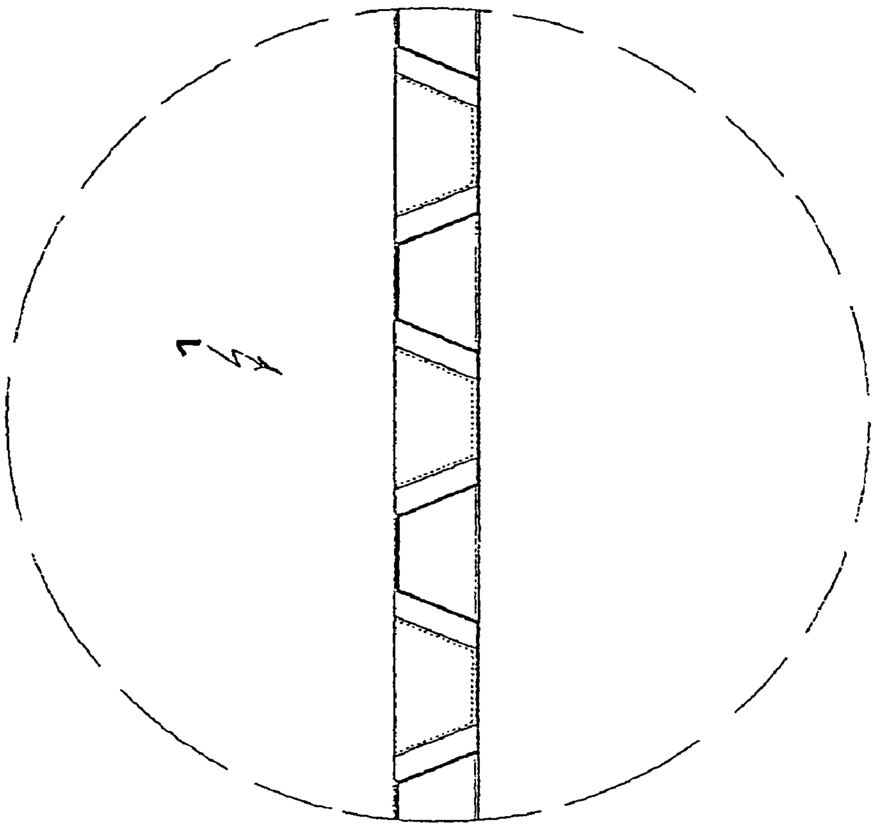
FIGS. 5B and 5C are two enlarged details of FIG. 5A.
Figure 5B:
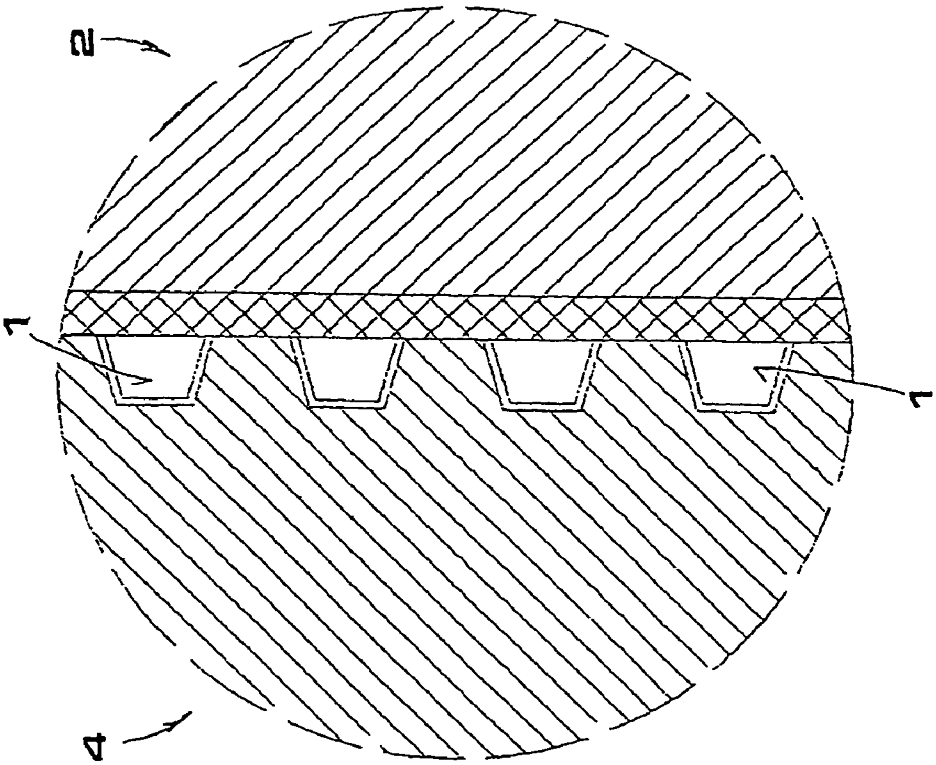
Figure 6:
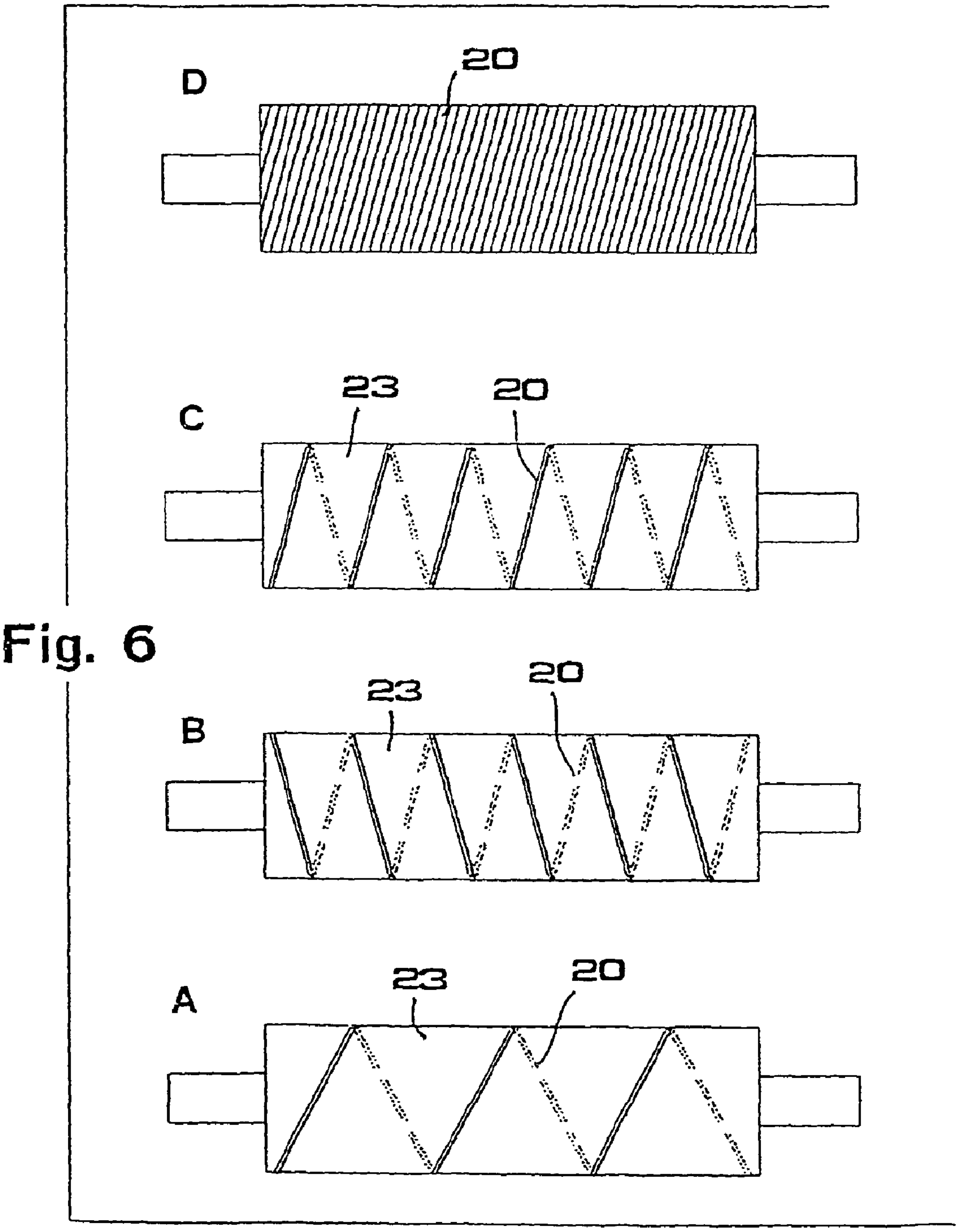
FIGS. 6A-6D are front views of different embodiments of a stabilizing cylinder for the apparatus according to the invention.

According to the example diagrammatically shown in FIG. 5A, the embossing means comprise an operating group, of a type known to those skilled in the art, having two pairs of embossing rollers and cylinders (3, 4; 30, 40) associated with a corresponding motor member (not shown) to drive them into rotation about respective longitudinal axes, as indicated by the arrows (R) in FIG. 5A.

Figure 7:
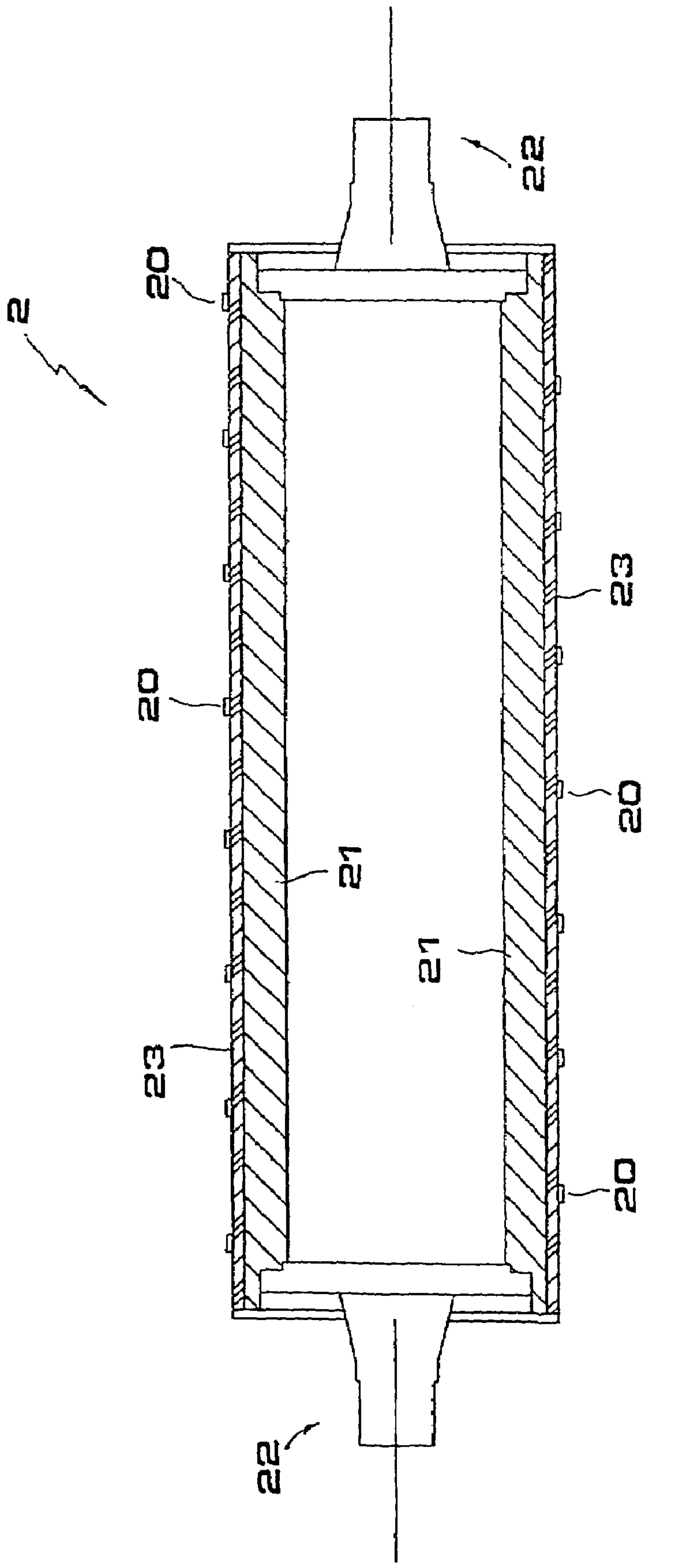
FIG. 7 is a schematic view in diametrical section of the roller (2)

According to the example illustrated in FIG. 7, the roller (2) comprises a rigid cylinder (21), made of steel for example, with coaxial end hubs (22) which define a shaft to be idly supported by a fixed structure (not shown). The cylinder (21) is provided with an elastic coating (23), for example of "Neoprene" rubber having a hardness ranging from 60 to 90 Shore. Applied on said coating (23), for example by a "Loctite" adhesive, is a hard surface (20) made of steel, for example.

The hard surface (20) can be formed, for example, by applying a helicoidal element having preset pitch and direction, as shown in FIGS. 6A-6D. In case of the example of FIG. 6D, the screw pitch is preset so that the hard surface (20) will fully cover the elastic surface (23).

In practice, the surface (23) acts as an elastic support for the surface (20) which is laid on it.

The roller (2) is positioned downstream of the embossing means, so that the coupled webs (1) result, before leaving the system, interposed between the embossing cylinder (4) and the roller (2).

The roller (2) is associated with hydraulic means, of a type known to those skilled in the art, which keep the same roller all the time in abutment against the cylinder (4).

The cylinder (4) and roller (2) cooperate with each other in compressing the two webs (5, 6) which form the coupled webs (1). More particularly, the two webs are squashed, while advancing towards the outlet, between the surface of cylinder (4) and the hard surface (20) of roll (2), thereby giving rise to a coupling of the webs which is sufficiently stable for the uses this type of material is intended for, even if no adhesive is employed between the two paper webs. The hardness of the surface (20) of roller (2) ensures that, in the above said final coupling of the two webs, the same surface will not deform to such an extent that could make it penetrate the cavities or impressions of cylinder (4), so that the embossing previously operated will not undergo any undesired alteration. Besides, as the surface (20) is mounted on an elastic support, any vibration possibly derived by the cooperation between the rotating cylinder (4) and roller (2) is substantially suppressed.

When it is desired that the above described effect will interest the whole width of the coupling, the length of roller (2) is made substantially equal to that of cylinder (4). If such effect has to concern only a portion of the coupling, the roller (2) can be shorter than the cylinder (4).

It will be appreciated that the webs (5, 6) may be either of individual or multiple type.

Figure 8:
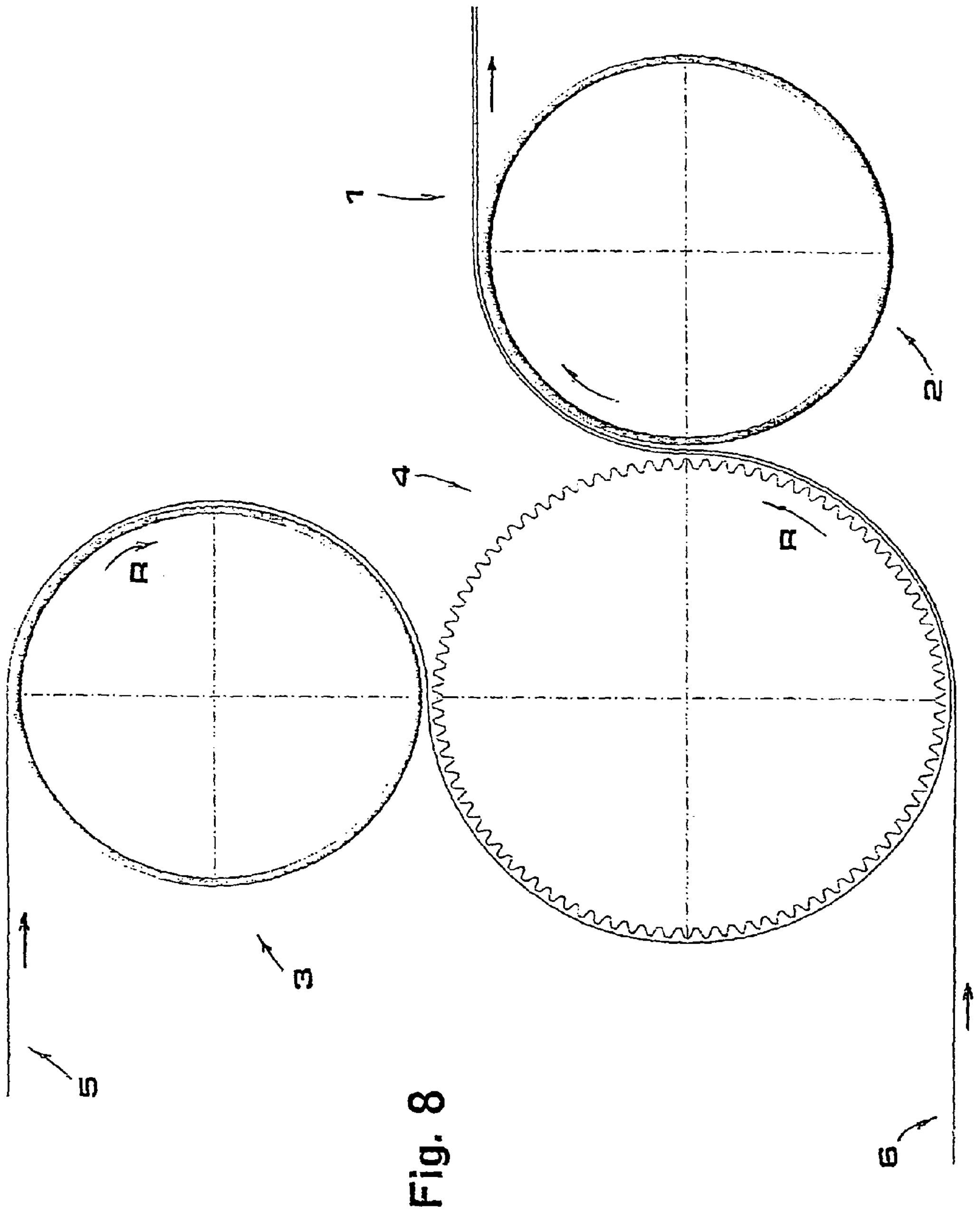
FIG. 8 is a diagram relating to another possible use of an apparatus according to the present invention.

The above described apparatus (2) is advantageously utilizable also within a system of a type shown in FIG. 8, according to which there is provided the union of an embossed web (5) with a smooth or non-embossed web (6) by means of a unique embossing group (3, 4) which operates the embossing of only one of the two webs. The operation of the apparatus (2) is identical to that previously described with reference to the schematic diagram of FIG. 5A.

Figure 9:
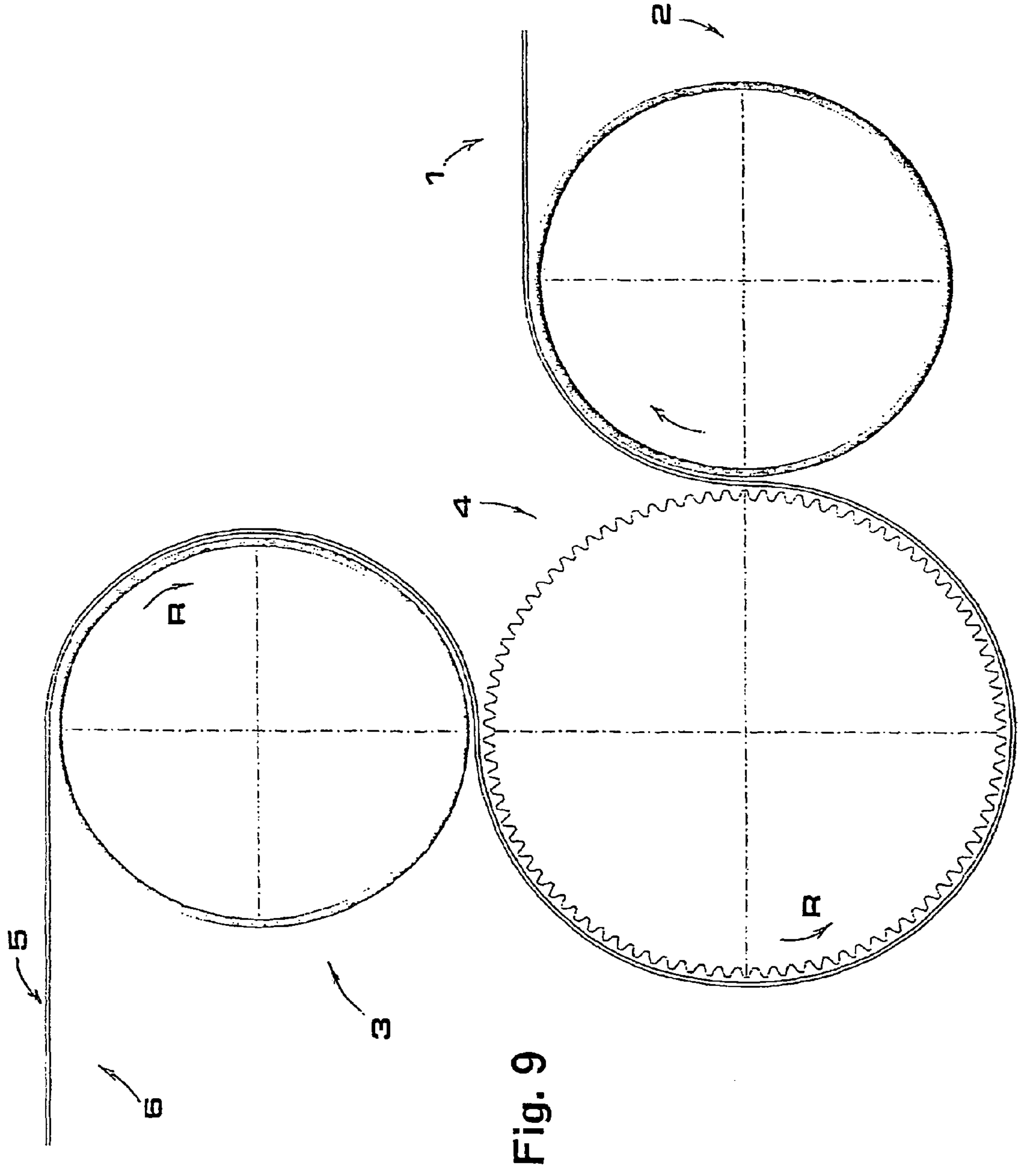
FIG. 9 is a diagram relating to a further possible use of an apparatus according to the present invention.
Figures 10A, 10B:
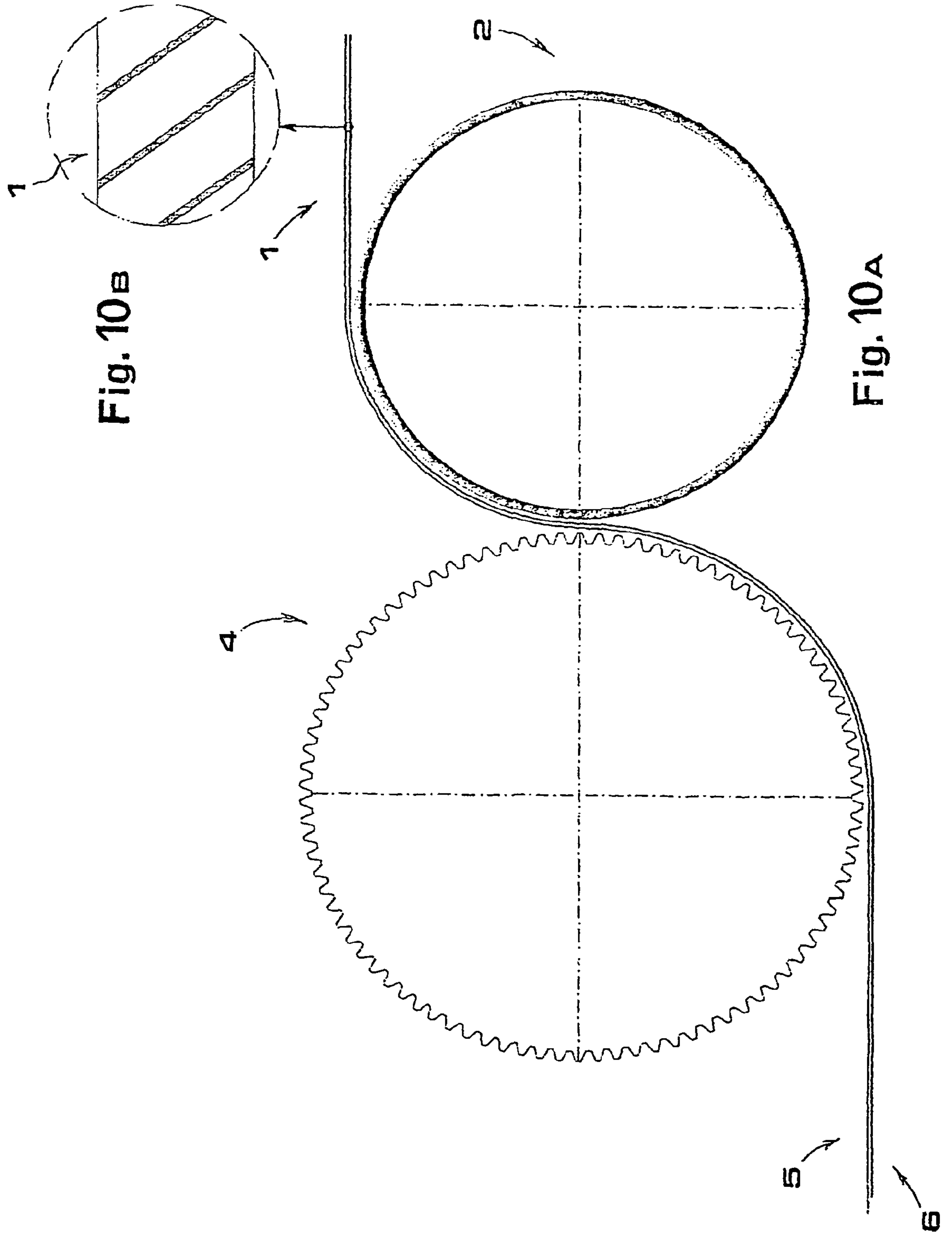
FIG. 10A is a diagram relating to yet another possible use of an apparatus according to the present invention.
FIG. 10B is a schematic, partial plan view of the product on output from the system of FIG. 10A.
Figure 12B:
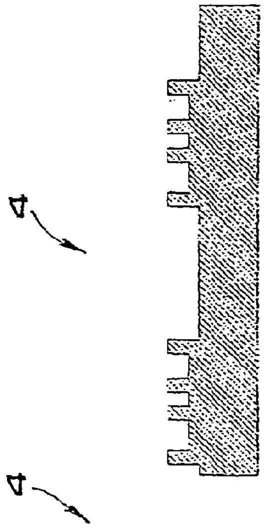
FIG. 12B is a section view taken on line N-N in FIG. 12A.
Figure 12A:
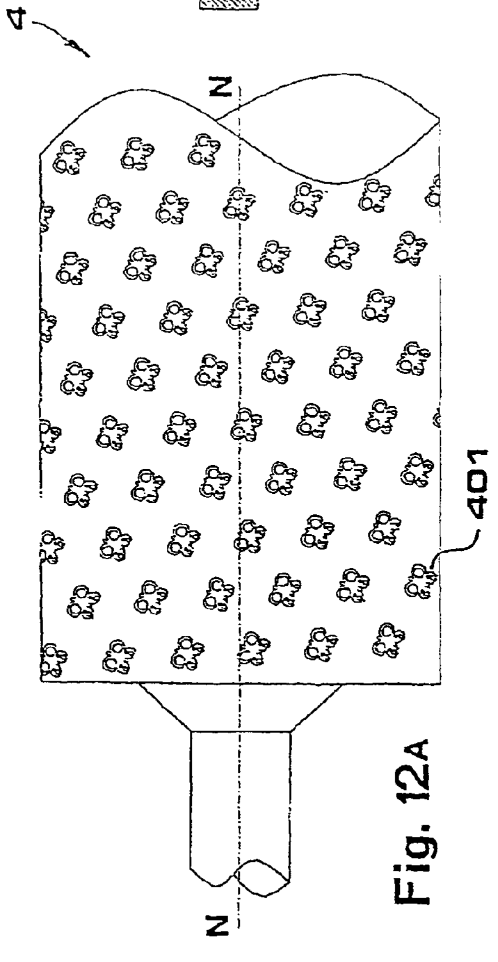
FIG. 12A is a schematic plan view of a further impression roller or cylinder to be used in association with an apparatus according to the invention.

The present apparatus is also advantageously utilizable also within a system of a type shown in FIG. 9, according to which there is provided the union of two webs (5, 6) which are both embossed by a unique embossing group (3, 4). Also in this case, the operation of the apparatus (2) is identical to that described with reference to the schematic diagram of FIG. 5A. Moreover, the present apparatus is also advantageously utilizable also within a system of a type shown in FIG. 10A, wherein no embossing is provided prior to the union of the paper webs. The cylinder (4) may be of a type provided either with simple pyramidal surface cuts, as illustrated in FIG. 10A, or with surface reliefs of a preset shape and design (401) and distributed over the surface of the same cylinder according to a predetermined order, as illustrated in FIG. 12A. In the latter case, the roller (2) may be advantageously of a type like the one represented in FIG. 6D, with the hard surface (20) fully covering the elastic surface (23). Also in this case, the operation of the apparatus (2) is identical to that described with reference to the schematic diagram of FIG. 5A.

Figure 11B:
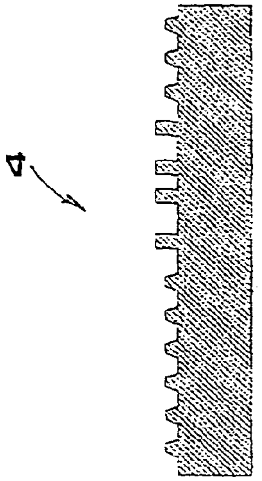
FIG. 11B is a sectional view taken on line M-M in FIG. 11A.
Figure 11A:
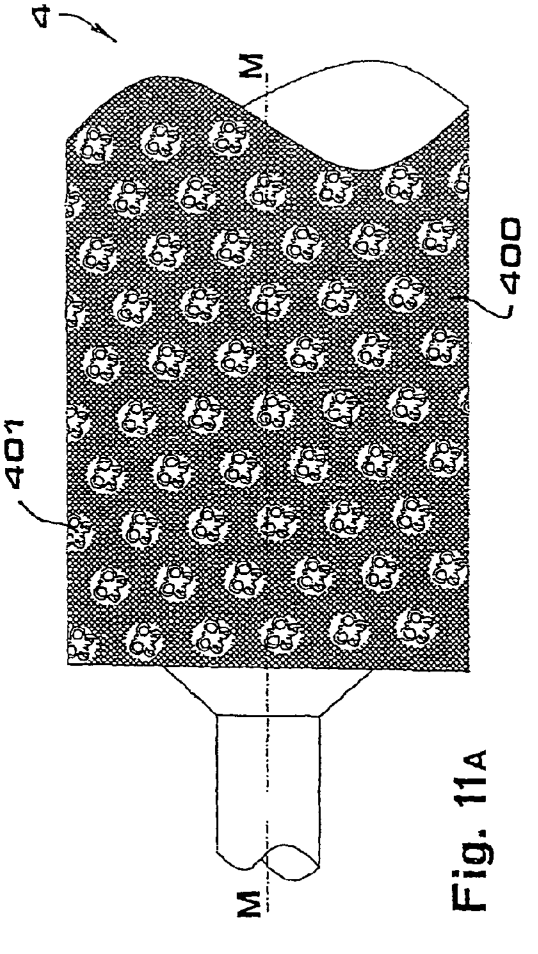
FIG. 11A is a schematic plan view of an impression roller or cylinder to be used in association with an apparatus according to the invention.

The cylinder (4) represented in FIG. 11A may be advantageously used within the scheme of FIG. 5A. Such cylinder exhibits pyramidal surface cuts (400)—shown in the drawing with a grid-like filling—and reliefs (401) of predetermined shape and size.

In view of the union of the two paper webs (5, 6) which, as previously set forth, may be multiple webs, an operating method according to the present invention includes compressing the paper webs between a pressure roller or cylinder (2) and an impression roller or cylinder (4), the impression cylinder being provided with surface reliefs and/or depressions, and the outer surface of said pressure cylinder being a hard surface.

According to the method of the present invention, the cylinder (4) may also be an embossing cylinder.

While a specific embodiment of the invention has been shown and described in detail to illustrate the application of the principles of the invention, it will be understood that the invention may be embodied otherwise without departing from such principles.

What is claimed is:

1. An apparatus for continually joining paper webs, the apparatus comprising:

a compressing roller comprising a rigid cylinder, an elastic coating and a rigid outer surface structure, said elastic coating having an outer elastic surface and an inner elastic surface, said inner elastic surface engaging said rigid cylinder, said outer elastic surface being connected to said rigid outer surface structure, said elastic coating having an elastic coating hardness, said rigid outer surface structure having a rigid outer surface structure hardness, said rigid outer surface structure hardness being greater than said elastic coating hardness;

an impression cylinder, said impression cylinder having a surface defining one or more depressions;

a first paper web;

a second paper web, said rigid outer surface structure and said surface of said impression cylinder defining a nip, said first paper web and said second paper web extending through said nip, said compressing roller pressing said first paper web and said second paper web in a direction of said impression cylinder to form a continuous web, said elastic coating supporting said rigid outer surface structure when said compressing roller presses said first paper web and said second paper web such that said rigid outer surface structure does not flexurally bend along an entire length thereof, wherein said first paper web and said second paper web do not penetrate said one or more depressions of said impression cylinder with said compressing roller pressing said first paper web and said second paper web in said direction of said impression cylinder.

2. An apparatus according to claim 1, wherein said rigid cylinder has a rigid cylinder hardness, said rigid cylinder hardness being greater than said elastic coating hardness, said rigid cylinder hardness being substantially equal to said rigid outer surface structure hardness.

3. An apparatus according to claim 1, wherein said rigid outer surface structure of said compression roller comprises a helicoidal body having a preset pitch and direction, said helicoidal body being in contact with said elastic surface.

4. An apparatus according to claim 1, wherein said rigid outer surface structure extends along an entire length of said elastic coating.

5. An apparatus according to claim 1, wherein said rigid outer surface structure of said compression roller is composed of steel, said rigid cylinder being composed of steel, said elastic coating being composed of rubber.

6. An apparatus according to claim 5, wherein said elastic coating hardness is in a range from 60 to 90 Shore.

7. An apparatus according to claim 6, wherein a pressure is applied to said first paper web and said second paper web via said compressing roller and said impression roller, said first paper web being joined to said second paper web via said pressure to form a continuous paper web.

8. An apparatus according to claim 1, wherein said rigid outer surface structure is composed of a continuous layer of steel.

9. An apparatus according to claim 8, further comprising an adhesive, wherein said rigid outer surface structure is connected to said elastic coating via said adhesive.

10. A method for carrying out the union of two paper webs by a mutual compression of paper webs, the method comprising:

providing a rigid cylinder;

applying an elastic coating to said rigid cylinder and applying a rigid outer layer to said elastic coating to form a pressure roller;

providing an impression roller having an impression roller outer surface defining one or more depressions, said rigid outer layer and said impression roller outer surface defining a nip;

providing a first paper web and a second paper web;

embossing at least one of said first paper web and said second paper web, wherein at least one of said first paper web and said second paper web has an embossed surface;

passing said first paper web and said second paper web through said nip;

pressing said first paper web and said second paper web in a direction of said impression roller with said pressure roller such that said rigid outer layer does not bend flexurally in a radial direction of said pressure roller along an entire length thereof via said elastic coating, wherein no portion of said first paper web and said second paper web is pressed into said one or more depressions of said impression cylinder via said pressure roller.

11. A method according to claim 10, wherein said elastic coating has an elastic coating hardness, said rigid cylinder having a rigid cylinder hardness, said rigid outer layer having a rigid outer layer hardness, said elastic coating hardness being less than said rigid cylinder hardness and said rigid outer layer hardness, said rigid cylinder hardness being substantially equal to said rigid outer layer hardness.

12. A method according to claim 11, wherein said rigid outer layer is composed of steel, said rigid cylinder being composed of steel, said elastic coating being composed of rubber.

13. A method according to claim 12, further comprising the step of:

providing an adhesive, said rigid outer layer being connected to said elastic surface via said adhesive, said elastic coating hardness being in a range of 60 to 90 Shore.

14. A method according to claim 10, wherein said rigid outer layer has a rigid inner surface, said rigid inner surface engaging said elastic coating, said elastic coating having an inner elastic coating surface, said inner elastic coating surface engaging said rigid cylinder.

15. An apparatus for continually joining paper webs, the apparatus comprising:

a plurality of paper webs comprising at least a first paper web and a second paper web, one of said first paper web and said second paper web having an embossed surface;

an impression roller having an outer impression roller surface defining a plurality of impression roller surface projections and a plurality of surface depressions, each of said depressions being located adjacent to one of said roller surface projections;

a compressing roller having a hardened outer surface and an elastic inner surface, said compressing roller and said impression roller defining a nip, said first paper web and said second paper web passing through said nip without any portion of each of said plurality of surface depressions receiving a portion of said first paper web and said second paper, said hardened outer surface being composed of steel, said hardened outer surface being located opposite said elastic inner surface, said impression roller and said compressing roller defining an outlet section, wherein a portion of said first paper web and a portion of said second paper web are located within said outlet section, said compressing roller compressing said portion of said first paper web and said portion of said second paper web in said nip in a direction of said impression roller to form a continuous paper web, wherein said elastic inner surface supports said hardened outer surface with said compressing roller pressing said portion of said first paper web and said portion of said second paper web in said direction of said impression roller such that said hardened outer surface does not bend in a radial direction of said compressing roller.

16. An apparatus according to claim 15, wherein said elastic inner surface has an elastic inner surface hardness, said elastic inner surface hardness being less than a hardness of said steel.

17. An apparatus according to claim 16, wherein said elastic inner surface is composed of rubber, said elastic inner surface hardness being in a range of 60 to 90 Shore.

18. An apparatus according to claim 17, wherein said hardened surface is composed of a plurality of metal elements, said metal elements being connected to said inner elastic surface, one metal element being located at a spaced location from another metal element in a helicoidal configuration along said elastic inner surface.

19. An apparatus according to claim 18, wherein said compressing roller presses said portion of said first paper web and said portion of said second paper web in said direction of said impression roller such said each of said depressions does not receive any portion of said first paper web and said each of said depressions does not receive any portion of said second paper web.

20. An apparatus according to claim 1, wherein said compressing roller exerts a pressure on said first paper web and said second paper web, said pressure comprising between 10 $kg/mm^2$ and 40 $kg/mm^2$, said rigid outer surface structure hardness comprising between 45 and 60 HRC, said elastic coating hardness comprising between 85 and 90 Shore.

* * * * *